Jan. 5, 1926.　　　　　　　　　　　　　　　　　　　　1,568,586
H. CLEMENT ET AL
OPTICAL INSTRUMENT
Filed August 9, 1922　　　　2 Sheets-Sheet 1
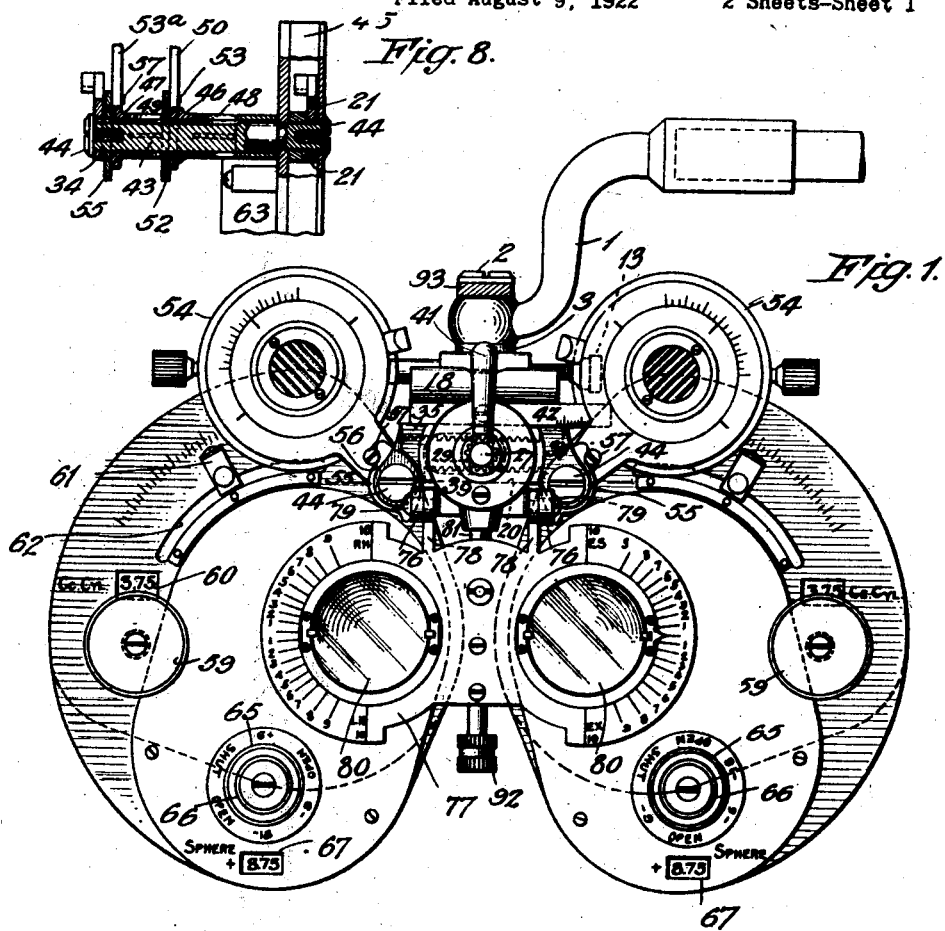
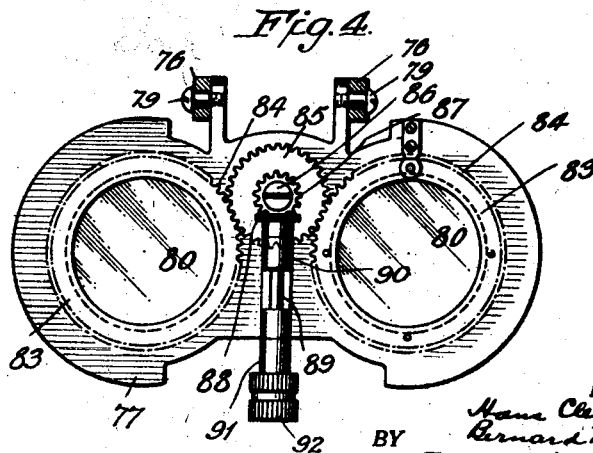
INVENTORS
Hans Clement
Bernard M. Barron
BY Stockbridge & Borst
ATTORNEYS

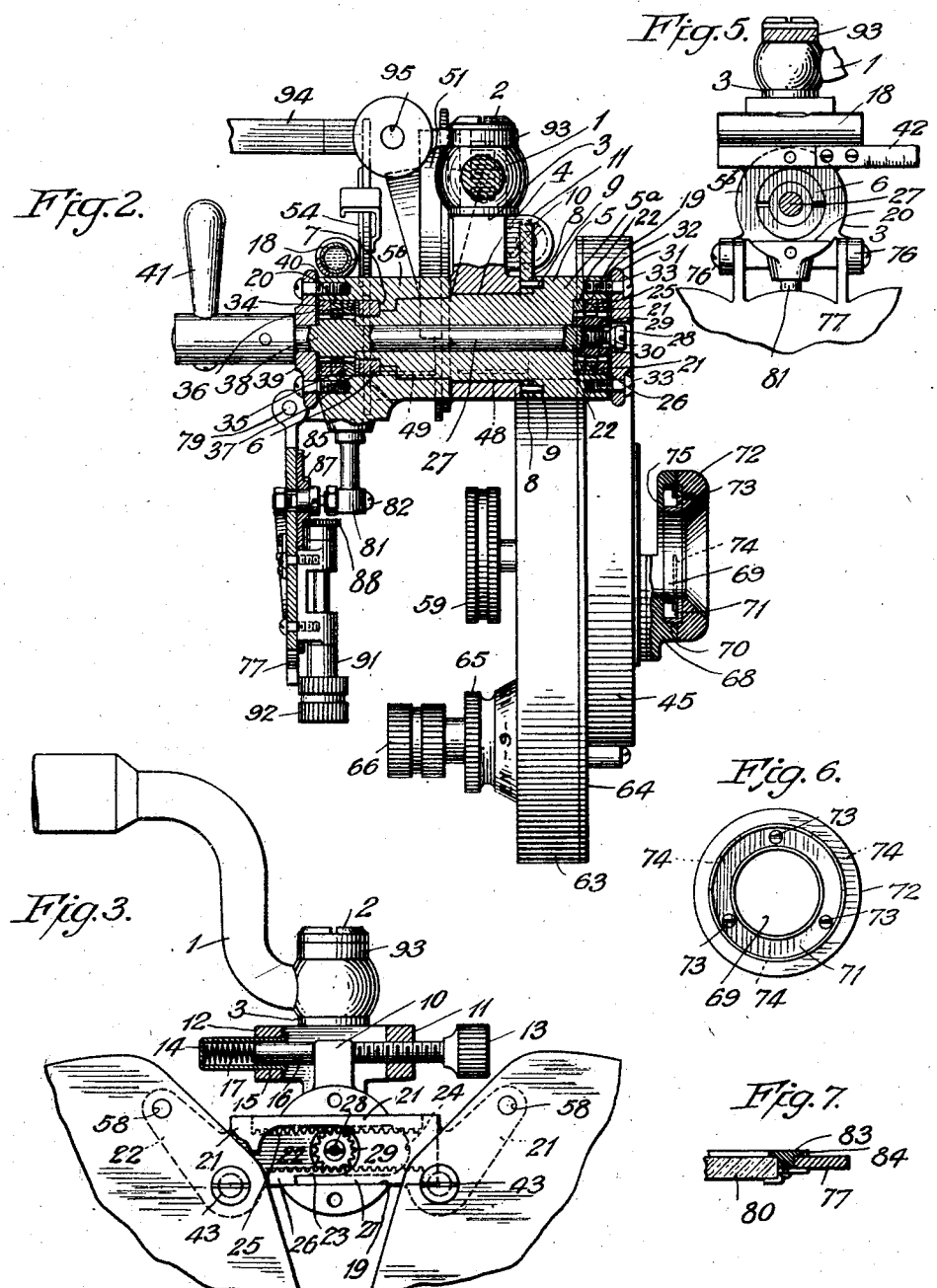

Patented Jan. 5, 1926.

1,568,586

UNITED STATES PATENT OFFICE.

HANS CLEMENT, OF NEW YORK, AND BERNARD M. BARRON, OF MOUNT VERNON, NEW YORK, ASSIGNORS TO GENERAL OPTICAL COMPANY, INC., A CORPORATION OF NEW YORK.

OPTICAL INSTRUMENT.

Application filed August 9, 1922. Serial No. 580,796.

*To all whom it may concern:*

Be it known that we, HANS CLEMENT and BERNARD M. BARRON, citizens of the United States, residing at New York, county of Bronx, and State of New York, and Mount Vernon, county of Westchester, and State of New York, respectively, have invented certain new and useful Improvements in Optical Instruments, of which the following is a full, clear, and exact description.

This invention relates to optical instruments, particularly to ophthalmological instruments, by which the refractive conditions of the eye may be ascertained and a determination made of the proper lens values which should be used to correct defective vision of various individuals. An object of the invention is to provide an improved instrument of this type which may be supported before a patient's face in such a manner that all of its parts are without the range of exhalations from the patient's nose and mouth and over but a minimum of the patient's face; in which the pupillary distance adjustment may be accomplished in a simple and effective manner without binding of the parts; and which permits of the convenient and rapid positioning of the various eye examination devices before the eyes of the patient and their convenient and expeditious manipulation during an examination. A further object is to provide an improved instrument of this type which can be adjusted angularly upon its support in order to level the instrument. A further object is to provide an improved instrument in which the phorometer prisms may be adjusted equally and angularly in their mountings in a positive and convenient manner. A further object is to provide an instrument of this type with improved means for mounting the chart holder for movement into and out of a position in which it displays a chart within the field of vision of the instrument. A further object is to provide an improved instrument for accomplishing each and all of the above results, which is compact, simple, efficient, convenient to operate, light in weight, sanitary, and relatively inexpensive. Other objects and advantages will be apparent from the following description and the novel features will be particularly pointed out in claims.

In the accompanying drawing:

Fig. 1 is a front elevation of an instrument constructed in accordance with this invention;

Fig. 2 is a sectional elevation through the same;

Fig. 3 is another sectional elevation through a portion of the instrument;

Fig. 4 is an elevation of the rear face of the phorometer;

Fig. 5 is a front elevation of a portion of the instrument with some of the parts removed;

Fig. 6 is an elevation of the removable or auxiliary eye piece;

Fig. 7 is a section through a portion of the phorometer; and

Fig. 8 is a section through the studs upon which the Maddox rods and double prism devices are mounted.

In the illustrated embodiment of the invention a bracket arm 1 is supported in any suitable manner such as from a standard or bracket (not shown) and at its lower end is connected by a screw 2 to the support or main frame 3. The support 3 depends from the bracket arm and is provided adjacent its lower end with an aperture 4 in which an elongated head member 5 is rotatably mounted. The head member preferably comprises two sleeve sections $5^a$ and $5^b$, the section $5^a$ passing through the aperture 4 in the support 3 and having a telescopic coupling with the section $5^b$. The section $5^a$ is flattened at diametrically opposite sections of its periphery and the section $5^b$ is milled across the coupled end to provide a slot that will receive the flat end of the section $5^a$ and prevent a rotation together of the sections when in telescopic relation. A nut 6 is threaded upon an extension of the telescoped end of the section $5^a$, and by engagement with an internal shoulder 7 upon the interior of the sleeve section $5^b$, prevents separation of the sections $5^a$ and $5^b$.

A ring 8 is placed over the sleeve section $5^a$ so as to be positioned between a shoulder of the section $5^a$ and the support 3 and is secured to the section $5^a$ for rotation therewith in any suitable manner such as by dowel pins 9 which enter suitable recesses in the shoulder wall of the section $5^a$. The ring 8 is provided with a radial arm 10 which projects upwardly between arms 11 and 12 of a forked lug that extends from the support 3 so as to partially embrace the arm 10. A screw 13 is threaded through the arm 11 and at its inner end engages with the arm 10 so that when the screw is rotated in one direction it will engage and shift the arm 10 toward the opposite arm 12, and when rotated in the opposite direction will move in a direction away from the arm 11.

A cup 14 passes through an aperture 15 in the arm 12 and is provided with a flanged open end which engages against the inner face of the arm 12 and limits movement of the cup through the aperture. A piston or plunger 16 is mounted for reciprocation in the open end of the cup and a helical spring 17 is disposed in the cup and is normally compressed between the bottom wall of the cup and the inner end of the plunger 16. Rotation of the screw 13 in one direction will shift the arm 10, and the arm 10 will engage the plunger 16 and force the same further into the cup, with the result that the spring 17 is further compressed and yieldingly opposes the movement of the arm 10. When the arm 10 is released by an opposite rotation of the screw 13, the spring 17 will automatically press the plunger 16 outwardly and force the arm 10 to follow the inner end of the screw. It will thus be obvious that by an adjustment of the screw 13, the elongated head 5 may be rotated in either direction through a partial revolution. A suitable liquid level 18 is mounted upon the section $5^b$ of the elongated head member so that the head may, by means of the screw 13, be placed in a level position for a purpose which will be apparent hereinafter.

The outer end faces of the sections $5^a$ and $5^b$ of the elongated head are provided with diametrical slots 19 and 20. In the slot 19 a pair of bars 21 and 22 are disposed for sliding movement endwise of themselves, so as to project for various distances from opposite sides of the head member. The bars 21 and 22, in their overlapping portions, are provided with apertures 23 and 24 which are elongated in the direction of sliding movement of the bars. The bar 21 is provided upon one face and along its upper edge with an auxiliary bar or strip 25 that is provided upon its lower edge with rack teeth that project downwardly beyond the upper elongated edge of the aperture 24.

The bar 22 is provided upon one face and along its lower edge with an auxiliary bar or strip 26, which has upon its upper edge rack teeth that project upwardly beyond the lower elongated edge of the aperture 23. The auxiliary bars 25 and 26 are arranged substantially in the same plane and are disposed between the bars 21 and 22, as shown particularly in Fig. 2. A shaft 27 extends axially through the sections of the elongated head member 5 and projects through the apertures 23 and 24 of the bars 21 and 22.

The end of the shaft which projects through these apertures is slit lengthwise for a short distance and is drilled and tapped axially. A screw 28 is threaded into this tapped end of the shaft, and the sections formed by the slits will be sprung outwardly. A pinion 29 is mounted upon the slit end of the shaft 27, and when the screw 28 is threaded into the tapped hole in the end of the shaft, the sections of the shaft formed by the slit will be forced outwardly by the engagement therewith of the beveled shoulder 30 of the screw which acts as a wedge thereon and frictionally locates the pinion against axial displacement on the shaft and against rotation independently of the shaft. The pinion meshes with the teeth of both bars or strips 25 and 26.

A cap plate 31 and a washer 32 are secured in a suitable manner, as by screws 33, against an end of the head and over the open end of the slot 19 for the purpose of confining the bars 21 and 22 and their auxiliary strips within the slot 19 without preventing sliding movement of the bars in the slot. The auxiliary bars or strips 25 and 26 are secured to their respective sliding bars in any suitable manner such as by pins or rivets, and the bars with their auxiliary strips together form rack bars which are operated in opposite directions by the shaft 27 and the common pinion 29. The cap plate 31 and the washer 32 are provided with central apertures through which access may be had to the head of the screw 28 for the purpose of adjusting the same to tighten the pinion upon the shaft.

In the slot 20, bars 34 and 35 similar to bars 21 and 22 are mounted in a manner similar to that described for the bars 21 and 22, and they are provided with auxiliary rack strips or bars 36 and 37 which correspond with the auxiliary bars or strips 25 and 26. The rack teeth of the strips or bars 36 and 37 mesh with the teeth of a common pinion 38 that is formed upon the shaft 27 at a point where the shaft passes through the elongated apertures in the overlapping portions of the bars. A cap plate 39 and a washer 40 are secured to the outer end face of the section $5^b$ and serve to close the open end of the slot 20 and confine the sliding rack bars within the slot in meshing relation with the common pinion 38. The shaft 27 may have a bearing in the cap plate 39 and at its forward end is provided with a suitable operating handle 41 by means of which the shaft 27 may be given rotation. A suitable scale 42 may be provided upon a forward face of the head member in a position to extend adjacent the edge of one of the rack bars and cooperate with an index marking thereon in order to indicate the extent of adjustments of the rack bars through operation of the handle 41. The scale will indicate the pupillary distance adjustment of the eye testing units carried by the bars as will appear hereinafter.

A stud post 43 extends between and passes through the ends of the forward and rear sliding rack bars, at each side of the head member 3, the bars being secured to the studs by screws 44 which are threaded into the ends of the studs. The rear end of each stud also passes through a casing 45 containing a battery of lenses whose function will appear hereinafter. The stud is held against separation from its attached casing 45 by the head of the screw 44 which overlaps the casing around the aperture through which the stud passes. Upon each stud, between the casing and the forward end, a pair of sleeves 46 and 47 are rotatably disposed. These sleeves are provided with longitudinally extending end slots 48 and 49, so that when the sleeves are mounted upon the stud the slit ends will be sprung outwardly slightly and provide with the studs friction sufficient to hold them in various adjusted positions.

The sleeves 46 are provided with arms 50 which carry at their outer ends suitable eye examining devices 51 such as double rotary prisms, well known in the art. The double prism devices 51 can therefore be rotated about the studs 43 as axes for a purpose which will appear hereinafter. A disc 52 is keyed upon each stud 43 between the sleeve 47 and the sleeve 46 and is provided with a peripherally extending notch in which a screw 53 carried by the adjacent arm 50 may move, the ends of the slot limiting the oscillation of the arm 50 and sleeve 46 upon the stud 43. The sleeves 47 are each provided with an arm 53ª which carries upon its end a suitable Maddox rod device 54 which may be oscillated about the stud 43 as an axis. A disc 55 is keyed upon each stud 43 between the forward rack bar and the sleeve 52, and is provided with a peripherally extending notch 56 in which a screw 57 carried by the arm 53ª moves, the ends of the notch serving to limit the movements of the screw and thereby the movements of the Maddox rod device about the stud 43.

The bars 21 and 22 at the ends which are connected to the studs 43 are elongated within the casings 45, and are secured thereto in a suitable manner such as by rivets or pins 58, so that the casings will be rigidly carried by the bars, the two points of connection, through the studs 43 and the pins 58, providing the necessary rigidity.

The two casings 45 which are carried by the sliding bars at each side of the elongated head depend therefrom in the same plane with one another, and are slightly spaced apart. When the handle 41 is operated to shift the sliding bars, the two casings 45 will be shifted toward and from one another for the purpose of varying the pupillary distance between the sight openings (not shown) in the casings 45. These sight openings are adjacent the adjacent edges of the casings 45, and the distance between them is varied by the separation or approach of the casings. Within each casing 45 there is provided a battery of cylindrical lenses which may be brought successively or in combinations into alignment with the sight opening in the casing by means of the manipulation of a button 59 that projects forwardly from the front wall of the casing and is mounted rotatably in the casing. The power or character of the cylindrical lenses which are in alignment with the sight opening may be indicated in a suitable manner through an observation opening 60 in the casing. A handle 61 shiftable along an arcuate slot 62 is adapted to simultaneously change the axes of all of the lenses of the battery in any suitable manner, such as for example in the manner disclosed in the U. S. patent to Woolf #1,240,289.

Secondary casings 63 are secured upon the forward faces of the casings 45 and each has a sight opening in alignment with the sight opening of the adjacent casing 45. Each casing 63 contains a battery of spherical lenses which may be brought successively in a desired order into alignment with the sight opening, the various discs mounting the lenses and comprising the battery being operated to bring the lenses into alignment with the sight opening by means of buttons 65 and 66. The power of the lenses which are manipulated through the button 65 may be indicated by means of a suitable reference mark provided upon the casing and cooperating with indications upon the face of the button. The powers of the lenses that are controlled by the button 66 will be indicated successively through the observation opening 67 of the casing as the lenses are brought into alignment with the sight openings. The details of the particular spherical and cylindrical batteries which we prefer to employ, and their adjustment, form the subject matter of other applications for patent, and per se form no part of the present application.

An eye piece 68 is mounted upon the rear face of each casing 45 and is provided with an aperture 69 in alignment with the sight opening of the casing 45. The outer face of the eye piece is provided with an annular recess 70 concentric with the aperture 69, and is adapted to receive and hold the annular channel piece 71 which is secured to the rear face of an auxiliary eye piece 72 in a suitable manner such as by screws 73. The outer peripheral wall of the channel piece is preferably slit as at 74 in order that the same may spring inwardly somewhat when inserted into the recess 70 and create friction with the wall thereof sufficient to hold the auxiliary eye piece against the main eye piece.

Preferably two or more auxiliary eye pieces are provided for each casing 45 so that some of them may be placed in a sterilizing device while a set are in use, the sets being interchanged for each new patient. In this manner, the device is absolutely sanitary and there will be little danger of the spread of contagious eye diseases through the eye pieces. The main eye piece 68 is provided with a slot 75 in its upper peripheral wall, which slot extends approximately half way around and through the eye piece so as to provide a mounting for receiving and supporting auxiliary lenses or eye testing devices which may be necessary or desirable in order to detect and measure unusual eye conditions such as cannot be readily determined by the particular devices provided directly upon the instrument.

The elongated head member 3 is provided upon its under wall with parallel lugs 76. The plate 77 of a suitable phorometer, such as a Stevens phorometer, is provided with lugs 78 which are pivoted to the lugs 76 in a suitable manner such as by screws 79, so as to be able to depend from the lugs 76 transversely across the lines of sight through the casings and position the prisms 80 in alignment with the sight openings. When the phorometer is swung upwardly about the screws 79 as axes, the prisms 80 will be carried out of the field of vision through the sight openings and will be held in that ineffective position. A lug 81 depends from the head member and is provided with a screw 82 which is adjustable forwardly and rearwardly so as to serve as an adjustable stop for the plate of the phorometer when in its lower operative position.

The prisms 80 are each mounted in a suitable manner in an annular bearing member 83 that is provided upon the portion disposed upon the rear face of the phorometer plate 77 with a peripheral flange having gear teeth 84. A pinion 85 is mounted by means of a screw 86 upon the rear face of the phorometer plate 77 and meshes with gear teeth 84 of both of the angular bearing members 83 of the prisms, so that both prisms will have corresponding and equal rotation. A second pinion 87 is formed as a part of or is attached to the pinion 85, and meshes with a pinion 88 which is carried upon the end of a shaft 89 that is rotatably mounted in suitable bearing lugs 90 and 91, provided upon the rear face of the phorometer plate 77. The shaft 89 is provided at its outwardly projecting end with a suitable operating button 92. When the shaft 89 is rotated by its button 92, the pinion 88 will be rotated, and will impart rotation to the pinion 87 and through it to the pinion 85. The pinion 85, because it meshes with both of the prism mountings, will cause concomitant and equal rotary movements of the mountings and their prisms.

A short arm 93 is secured upon the support 3 by means of the screw 2 which passes the arm and clamps it to the support. A relatively long chart supporting arm 94 is pivoted to the free end of the arm 93 by a pin 95 so that the arm 94 may be swung within a vertical plane into and out of a horizontal position. The arm 94 serves to support for adjustment along its length, a suitable examination chart (not shown) which when the chart holder 94 is in its horizontal position will extend transversely across the field of vision through the sight openings. The adjustment of the chart along the holder 94 serves to position the chart at various distances from the eye of the patient. When the chart is not in use the holder and chart may be swung upwardly about the pin 95 as an axis into a position above the instrument in which it will not interfere with the operation or manipulation of the remaining parts of the instrument.

In the use of the instrument the bracket arm 1 is supported in a suitable manner either from a standard or from a bracket, with the support 3 depending therefrom and holding the instrument at a level such that the sight openings of the casings are before the patient's eyes. The screw 13 is manipulated until the elongated head member is adjusted angularly and until the liquid level 18 indicates that the instrument is in a level position. The arm 41 is then manipulated to shift the units or casings at each side of the head member toward or from those upon the other side of the head so as to set the instrument for the pupillary distance of the particular patient to be examined. The double rack bar support for each unit insures an easy adjustment without binding. A sterilized set of auxiliary eye pieces 72 is applied to the permanent eye pieces 68. The lenses in the casing 45 and 63 are adjusted by means of the proper buttons until the proper lens values are found which will properly correct the defective vision of the particular patient under examination.

If the occasion requires it, the double prism mounting 51 may be swung downwardly into alignment with the sight openings and the prisms may be adjusted together or relatively to one another, in a manner well known to opticians. When their use is not needed they may be swung upwardly out of the field of vision through the sight openings. In a similar manner the Maddox rod devices may be swung downwardly into operative position in the field of vision and then returned to their upper inoperative position. The phorometer may also be swung downwardly into operative position in the field of vision and the prisms may be rotated equally by means of the button 92.

When the use of the chart is desired, it is merely necessary to swing the arm 94 about the pin 95 until it reaches a horizontal position, after which it is necessary merely to adjust the chart lengthwise along the arm 94. The chart and holder when not in use may be shifted upwardly into an inoperative position. The adjacent edges of the casing 45 and 63 below the sight openings are made to diverge so as to expose the nose and mouth of the patient's face.

Inasmuch as the supporting parts are entirely above the sight openings, only a minor portion of the face of the patient will be covered and none of the parts will be within the range of exhalations from the patient's nose and mouth. In this manner the instrument will not serve as a medium for the transfer of bacteria between various patients and the device will be entirely sanitary. The instrument is also practically complete in itself for the determination of the usual defects of vision and all of the manipulations may be performed in a convenient and expedient manner. The device is also extremely compact, light in weight, attractive in appearance, and accurate and efficient.

It will be obvious that various changes in the details and arrangements of parts of the embodiment herein described and illustrated for the purpose of explaining the nature of the invention, may be made by those skilled in the art within the principle and scope of the invention.

We claim:

1. In an optical instrument, a support, an elongated head member carried by said support, a plurality of parallel rack bars carried by said head member in spaced pairs and extending transversely thereof, said bars being slidable endwise of themselves thereon, each pair extending from opposite sides of the head, a shaft rotably carried by the head and extending transversely of the bars, pinions carried in spaced relation by said shaft and meshing with the rack bars to cause simultaneous movements of the bars, and eye examination units carried by said bars to be separated or brought together by operation of the shaft and rack bars.

2. In an optical instrument, a support, a head member rotatably carried by the support and adjustable angularly thereon, a plurality of parallel rack bars carried by said head member in spaced pairs and extending transversely thereof, said bars being slidable endwise of themselves thereon, each pair extending from opposite sides of the head, a shaft rotatably carried by the head and extending transversely of the bars, pinions carried in spaced relation by said shaft and meshing with the rack bars to cause simultaneous movements of the bars, and eye examination units carried by said bars to be separated or brought together by operation of the shaft and rack bars.

3. In an optical instrument, a support, an elongated head member carried by said support, and having a slot extending horizontally across each end face and an aperture lengthwise, a pair of rack bars slidably mounted in each slot and adjustable to project variable extents from opposite sides thereof, plates confining the bars in said slots, a rotatable shaft extending through the aperture, pinions carried by the shaft and meshing with the rack bars for operating the latter in said slots, and eye examination units carried by said bars and adjustable therewith.

4. In an optical instrument, a support having an aperture, an elongated head member comprising two sections one of which has a reduced extension passing through the aperture and having telescopic relation with the other section, means normally coupling said sections against separation but operable to permit of their separation, the telescopic portions of the sections having complementary interlocking parts for causing the rotation of the sections together in the said aperture, means for adjusting the head member angularly in said aperture and holding it in adjusted positions, and eye examination devices carried in spaced relation by said head member.

5. In an optical instrument, an elongated head member, a plurality of parallel bars carried by the head in spaced pairs and extending transversely thereof, said bars being slidable endwise of themselves on said head, the bars of each pair extending from the head in opposite directions and overlapping one another with apertures in the faces of the overlapping portions which apertures are elongated in the direction of sliding movement, each bar of each pair having upon its face toward the other bar of that pair a strip extension with rack teeth, the teeth extending beyond the adjacent elongated edge of the aperture, the strip extensions of each pair being disposed in substantially the same plane and upon opposite elongated sides of the apertures of the bars, a shaft rotatably carried by the head and extending through the apertures of each pair of bars, a pair of pinions carried by said shaft, one common to and meshing with the teeth of the extensions of each pair of the bars, whereby rotation of the shaft will shift the bars of each pair in opposite directions concomitantly, and eye examination units carried by the bars at each side of the head whereby rotation of the shaft will vary the distance apart of the units and thereby their pupillary distance.

6. In an optical instrument, a bracket arm, a support member, a screw for securing the bracket arm to the support member, an eye examination device carried by the member, an arm clamped to said support member by said screw, and a chart holder pivoted to said arm for movement about a horizontal axis into and out of the field of vision through the examination device.

7. In an optical instrument, an eye examination device having a sight opening, an eye piece carried by the device and having an aperture aligned with the sight opening and a recess in its outer face, and an auxiliary eye piece having a split ring fitting into the recess for holding the auxiliary eye piece detachably upon said first named eye piece.

8. In an optical instrument, a head member, eye examination units carried by the head member in spaced relation to one another, said units each having a sight opening, a plate pivoted to the head member and adapted to be swung across the line of vision through the sight openings, said plate having apertures spaced apart in substantial alignment with the sight openings, annular prism carriers rotatably mounted in said apertures and having peripheral gear teeth, a pinion pivoted to the plate and meshing with both of the carriers, and means including a shaft extending beyond an edge of the plate and a reduction gear connection between the shaft and pinion for operating the pinion directly to cause a simultaneous slow motion operation of the carriers.

In witness whereof, we hereunto subscribe our signatures.

HANS CLEMENT.
BERNARD M. BARRON.